April 15, 1924.　　　　　　　　　　　　　　　　1,490,109
H. HORT
DEVICE FOR TESTING THE CENTER OF GRAVITY OF RAPIDLY ROTATING
PARTS OF MACHINERY
Filed May 15, 1922　　　3 Sheets-Sheet 1
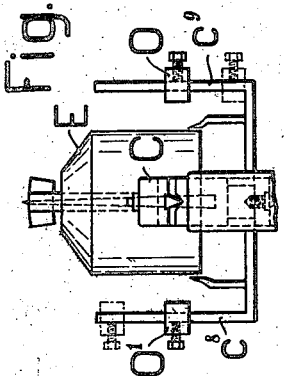
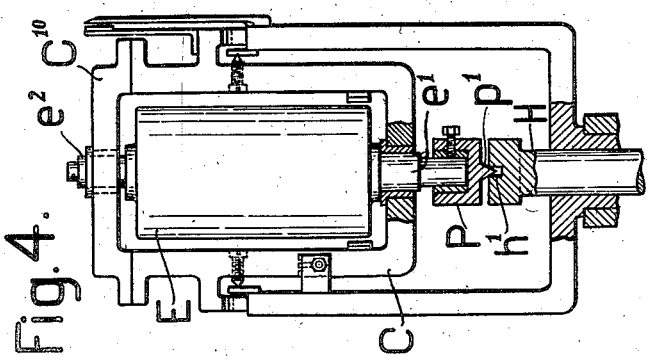
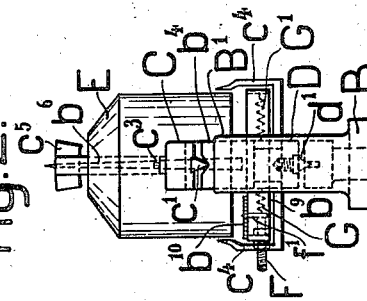
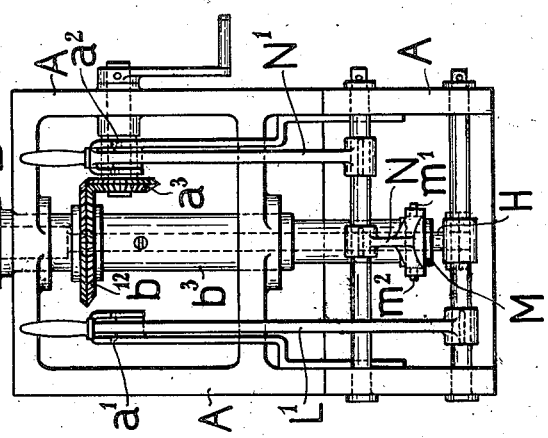
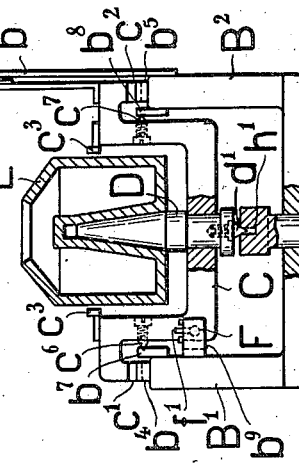
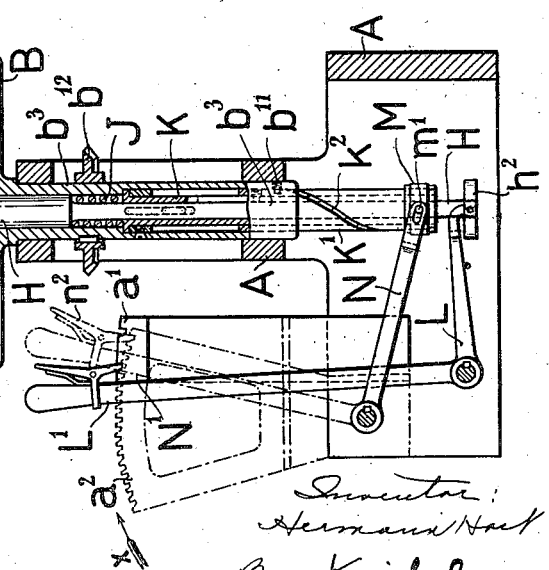

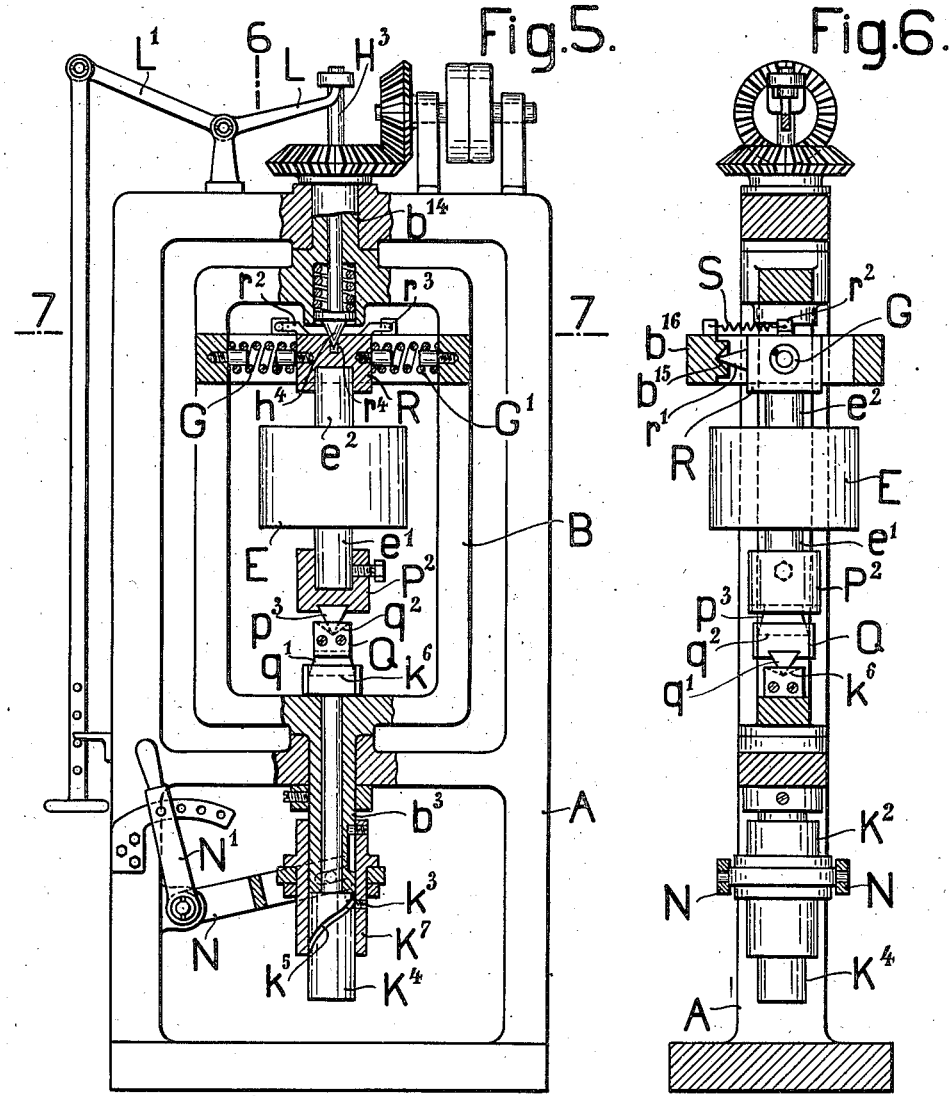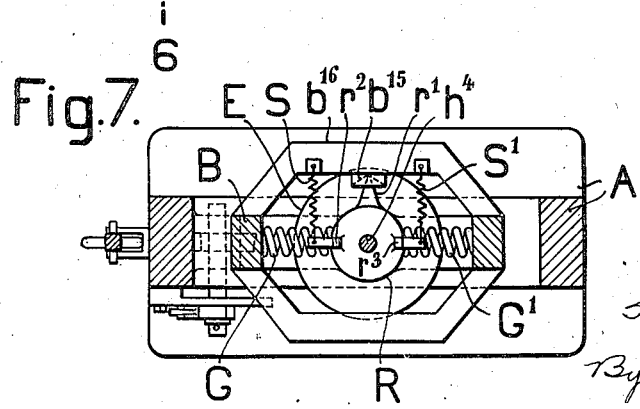

April 15, 1924.                                                              1,490,109
                              H. HORT
       DEVICE FOR TESTING THE CENTER OF GRAVITY OF RAPIDLY ROTATING
                          PARTS OF MACHINERY
                          Filed May 15, 1922      3 Sheets-Sheet 3
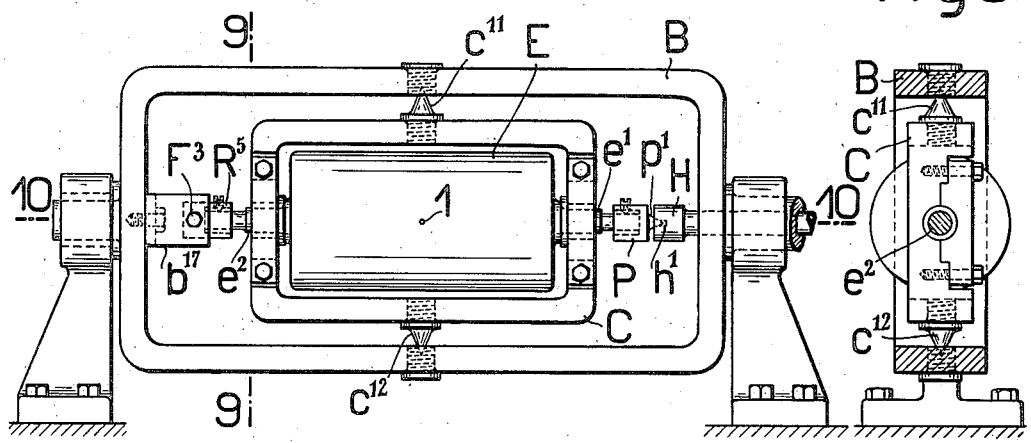
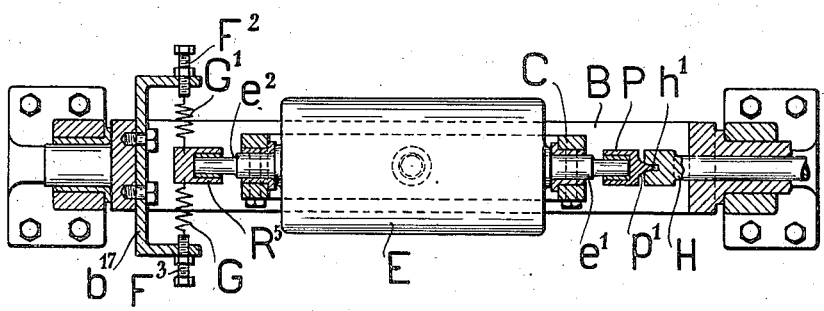

Patented Apr. 15, 1924.

1,490,109

UNITED STATES PATENT OFFICE.

HERMANN HORT, OF ESSEN, GERMANY, ASSIGNOR TO FRIED. KRUPP AKTIENGESELL-SCHAFT, OF ESSEN-ON-THE-RUHR, GERMANY.

DEVICE FOR TESTING THE CENTER OF GRAVITY OF RAPIDLY ROTATING PARTS OF MACHINERY.

Application filed May 15, 1922. Serial No. 561,237.

*To all whom it may concern:*

Be it known that I, HERMANN HORT, residing at Essen, Germany, a citizen of the German Republic, have invented a certain new and useful Improvement in Devices for Testing the Center of Gravity of Rapidly Rotating Parts of Machinery, of which the following is a specification.

This invention relates to devices for dynamically determining the position of the center of gravity of rapidly rotating parts of machinery.

The static method employed for this purpose and having for its object to put the center of gravity of the machinery part into its axis of rotation, offers no security that the machinery part will rotate quietly, that means, that it will not transfer onto its supports, because of its rotation, forces which have a transverse direction with respect to the axis of rotation of the part to be tested. Forces of this kind cannot arise only in the case the axis of rotation of the machinery part coincides with one of the main axes of its ellipsoid of inertia. Therefore, the devices for dynamically determining the position of the center of gravity have for their object to determine the position of one of the main axes of the said ellipsoid of inertia with respect to the axis of rotation of the machinery part to be tested and to enable, in this way, to put this main axis onto the said axis of rotation.

The invention has for its special object to produce a device of the character stated which enables to determine the position of the ellipsoid of inertia with a comparatively small number of revolutions of the machinery part, in contradistinction to known devices of this kind which permit of this testing operation to be carried out, only with a generally very high, and therefore critical, number of revolutions.

The object aimed at is realized by the arrangement, construction and combination of parts to be hereinafter described and particularly pointed out in the appended claims.

On the annexed drawings five embodiments of the subject-matter of the invention are illustrated by way of example, Fig. 1 showing an axial longitudinal section of the first embodiment, Fig. 2 an elevation of Fig. 1, seen from the left, Fig. 3 a portion of the second embodiment in elevation, Fig. 4 a view, corresponding to Fig. 1, of a portion of the third embodiment, Fig. 5 a view, corresponding to Fig. 1, of the fourth embodiment, Fig. 6 a section on line 6—6 of Fig. 5, seen from the left, Fig. 7 a section on line 7—7 of Fig. 5 seen from above, Fig. 8 a front view of the fifth embodiment, Fig. 9 a section on line 9—9 of Fig. 8, seen from the left, and Fig. 10 a section on line 10—10 of Fig. 8, seen from above.

The embodiment shown in Figs. 1 and 2 will be described first, this embodiment being designed for dynamically testing machinery parts which have to be supported by means of freely extending separate pivots.

Referring now to the drawings, A is the stationary frame of the device in which a stirrup-shaped frame B having two vertically extending legs $B^1$ and $B^2$, is mounted for rotation by means of a vertical hollow pivot $b^3$. The legs $B^1$ and $B^2$ support two bearing pans $b^4$ and $b^5$ on which a bent-down carrier C is mounted for oscillation by means of knife-edges $c^1$ and $c^2$.

On the carrier C there is mounted for rotation a conical pivot D the object of which is to receive the machinery part E to be tested. The axis of this pivot D lies in the middle plane of the carrier C, passing through the bearing edges of the knives $c^1$ and $c^2$ and is at right angles to the axis of the knife-edge $b^4$ $c^1$, $b^5$, $c^2$. On the carrier C are further provided two pointers $c^3$ situated opposite each other and having indicating edges which lie in the above-mentioned middle plane of the carrier C and are in parallel with the axis of the pivot D. Furthermore, two pointers $c^4$ (Fig. 2) are mounted on the carrier C opposite each other and having indicating edges which likewise are in parallel with the axis of the pivot D and lie in a plane passing through the axis of this pivot and running at right angles to the above-mentioned middle plane of the carrier C. The frame B carries a pointer $b^6$ which faces a graduation plate $c^5$. This plate is connected to the carrier C and shows a circular graduation.

Finally, two centering screws $c^6$ and $c^7$ (Fig. 1) are provided on the carrier C, opposite to plates $b^7$ and $b^8$ which are fixed to the legs $B^1$ and $B^2$, these centering screws being intended to prevent the carrier C from moving in the direction of the axis of the knife-edge bearing $b^4$ $c^1$, $b^5$, $c^2$. The carrier C along with the parts permanently connected to it (D, $c^3$, $c^4$ $c^5$ etc.) is balanced for itself so that one of the main axes of its ellipsoid of inertia exactly coincides with the axis of rotation of the pivot D. On the leg $B^1$ of the frame there is further fixed an ⊔-shaped frame $b^9$ one of the two parallel legs of which carries a set-screw F serving to adjust a pointer $f^1$. This latter faces a graduation $b^{10}$ and can be shifted with respect to the frame $b^9$. On the set-screw F is fixed one end of a tension spring G (Fig. 2) the other end of which is attached to the carrier C. A second tension spring $G^1$ is interposed between the frame $b^9$ and the carrier C, the pulling force of which spring acts against that of the spring G.

In the hollow pivot $b^3$ of the frame B is lodged a shaft H so as to rotate and undergo longitudinal displacement. On its free end facing the carrier C this shaft has a conical recess $h^1$ which, in the position of the parts shown in Figs. 1 and 2, is engaged by a centering point $d^1$ of the pivot D. The shaft H is under the action of a spring J tending to shift it towards the carrier C and abutting against a collar provided on a hollow shaft K. This latter is lodged likewise in the hollow pivot $b^3$, coaxially with the shaft H, and capable of rotating but not of being shifted. The shaft H passes through the hollow shaft K and is connected thereto by a slot and key connection so as to be capable of being shifted with but not of rotating with the shaft K.

On its lower end the shaft H has fixed on it a disk $h^2$ which forms the abutment for one arm, L, of an angle-lever mounted for oscillation on the stationary frame A of the device. The other arm, $L^1$, of the angle-lever L $L^1$ can be fixed on a toothed arc $a^1$ rigidly connected to the frame A, by means of a latch.

The shaft K is surrounded by a hollow shaft $K^1$, these two shafts being interconnected by slot and key so as to be shifted but not to rotate relatively to each other. The shaft $K^1$ possesses a helical groove $k^2$ permanently engaged by a pin $b^{11}$ fixed on the hollow pivot $b^3$. At its lower end the shaft $K^1$ carries a loose ring M non-displaceably mounted on it and having two pins $m^1$ and $m^2$ engaging respective slots of an arm N of an angle-lever pivoted on the frame A. The other arm, $N^1$, of the angle-lever N $N^1$ can be fixed on a toothed arc $a^2$ connected to the frame A, by means of a latch $n^2$ (Fig. 1). Finally the hollow pivot $b^3$ carries a bevel wheel $b^{12}$ which is in mesh with a hand-operated bevel wheel $a^3$ mounted on the frame A (Fig. 2).

Before the testing operation the parts take the relative position shown in Figs. 1 and 2. The springs G and $G^1$ are so adjusted, by means of the set-screw F that they will maintain the carrier C in a position in which its middle plane passing through the bearing edges of the knives $c^1$ and $c^2$, passes through the axis of the hollow pivot $b^3$, this latter axis thus coinciding with the axis of the pivot D. The angle-lever L $L^1$ is being fixed in a position so that the shaft H assumes the position in which the centering point $d^1$ of the pivot D fully engages the recess $h^1$ of the shaft H. The angle-lever N $N^1$ is likewise fixed so that the shaft $K^1$ is prevented from being shifted and, therefore, is coupled with the hollow pivot $b^3$ by means of the pin $b^{11}$.

Before dynamically determining the center of gravity of the machinery part in question, the latter has to be tested statically that means, its center of gravity must be brought to lie in the axis of rotation of the part. The part E is then placed upon the pivot D and the frame B set in rotation by means of the bevel gear $a^3$ $b^{12}$. This rotation is taken part in by the carrier C and is transferred also onto the shafts $K^1$, K and H, since the hollow pivot $b^3$ is coupled to the shaft $K^1$ and this latter, through the intermediary of the shaft K, to the shaft H.

As soon as the frame B has reached a certain angular velocity which is, however, comparatively small, the arm $L^1$ of the angle-lever L $L^1$ has to be rocked in the direction of arrows $x$ (Fig. 1) until the recess $h^1$ of the shaft H, displaceable by means of the angle-lever L $L^1$, has almost fully released the centering point $d^1$ of the pivot D so that this point will project into said recess to a small extent only. Thereupon the lever arm $L^1$ is fixed again on the toothed arc $a^1$. Now the carrier C is able to swing out, about the axis of its knife-edge bearing, with respect to the frame B which continues to rotate, until the centering point $d^1$ will touch the surface of the conical recess $h^1$.

As the axis of rotation of the machinery part generally will not precisely coincide with one of the main axes of the ellipsoid of inertia of the part, a couple of forces will arise, according to known rules of dynamics, during the common rotation of the frame B and the part to be tested, which couple of forces will lie in a plane passing through the axis of rotation of the part and through the main axis, nearly coinciding with this axis of rotation, of the ellipsoid of inertia of the part. If the plane of this couple of forces, as it generally firstly will be the case, does not pass through the axis of the knife-edge bearing of the carrier C, the couple of forces will cause a rotation of the latter about its knife-edge bearing. Owing to the rapidly increasing reaction of one of the springs G or $G^1$ this rotation, however, will remain, within the range determined by the touching of the point $d^1$ on the surface of the recess $h^1$, limited to a comparatively small amount. The size of the angle of rotation which latter will be of a sufficient amount already with a comparatively small angular velocity of the frame B, is indicated by the pointer $b^6$ on the graduation plate $c^5$ and can easily read off owing to the small angular velocity the frame B is rotating with.

Now at first it will be required to turn the part E, with respect to the carrier C, about the axis of the pivot D up to such an angular position that the plane of the couple of forces will pass through the axis of the knife-edge bearing of the carrier C. In this case the turning moment of the couple of forces with respect to the axis of the knife-edge bearing is equal to zero so that the pointer $b^6$ no longer will indicate a deflection. In order to realize the above-mentioned problem the recess $h^1$ of the shaft H is brought, while the frame continues to rotate, into full engagement with the centering point $d^1$ by returning the angle-lever L $L^1$ into its initial position. Further the lever arm $N^1$, after releasing the latch $n^2$, is turned a certain amount opposite to the direction of arrow $x$. This rotation of the angle-lever N $N^1$ causes the shaft $K^1$ to move towards the frame B, the pin $b^{11}$ of the hollow pivot $b^3$ engaging the helical groove $k^2$ of the shaft $K^1$ compelling this shaft to turn with respect to the hollow pivot $b^3$ which turning movement is transferred, through the intermediary of the shaft K coupled for rotation both to the shaft $K^1$ and H, to this latter shaft H and from it through the friction clutch $h^1$ $d^1$, on to the pivot D along with the part E to be tested, thus causing this latter to undergo a rotary displacement relatively to its carrier C. Now the clutch $d^1$ $h^1$ is disengaged again thus causing the carrier C to swing out with respect to the further rotating frame B by an angle which generally can be read off again on the pointer $b^6$. The machinery part is then once more turned with respect to the carrier C in the described manner and this turning is repeated until the carrier C will no longer show a deflection. As soon as this is the case, the plane of the couple of forces will pass through the axis of the knife-edge $b^4$ $c^1$, $b^5$ $c^2$ and, consequently, one of the main axes of the ellipsoid of inertia of the part E lies in a plane passing through the axis of the pivot D and that of the knife-edge bearing $b^4$ $c^1$, $b^5$ $c^2$. This plane intersects the shell surface of the part E along lines which will come to be marked on the part E through the intermediary of the pointers $c^3$ after the device has been brought to a standstill.

Now the part E has to be turned by 90° with respect to the carrier C by means of the gearing $N^1$ N, M, $K^1$, K H $h^1$ $d^1$ D so that the lines marked thereon will be exactly opposite the indicating edges of the pointers $c^4$ (Fig. 2). Then the device is started again. With the angular position the part E now assumes with respect to the carrier C, the couple of forces acting on the part E upon rotation is of the same size as the turning moment exerted by it with respect to the axis of the knife-edge bearing $b^4$ $c^1$, $b^5$ $c^2$ on the carrier C, as the plane of said couple of forces is at right angles to the axis of said bearing. If, therefore, the tension of the springs G and $G^1$ is altered by means of the set-screw F until the pointer $b^6$ will no longer indicate a deflection of the carrier C upon rotation of the frame B and with the clutch disengaged, the turning moment exerted upon the carrier C by the springs G and $G^1$ will exactly be equal to the turning moment of said couple of forces. The amount of said turning moment is read off on the graduation $b^{10}$. Thus the amount of the couple of forces is known and, since the plane in which this couple of forces is acting is already known, the position of the main axis in question of the ellipsoid of inertia of the part to be tested can be determined without difficulty by calculation and can be, in a known manner, so corrected by conveniently altering the distribution of the masses that the main axis of inertia will coincide with the axis of rotation.

In the case of the second embodiment illustrated in Fig. 3 the moment of the couple of forces is not balanced by adjustable tension springs but by the centrifugal force of adjustable weights. To this end the carrier C has fixed on it at both sides of its middle plane, two parallel arms $c^8$ and $c^9$ carrying each a shifting weight O and $O^1$. In other respects the arrangement of the parts is the same as in the first described embodiment.

Upon testing the machinery part E the two weights have to be shifted always by the same amount but in opposite directions until the carrier C will no longer deflect. The size and distance away of the weights O and $O^1$ will give a measure for the amount of the moment of the couple of forces. In other respects the manner of working of the device is the same as in the first embodiment and needs, therefore, no further explanation. It may, however, still be noted that the manner of shifting the weights O and $O^1$ as above described, is necessary in order to not influence the position of the center of gravity of the whole system of parts swinging about the axis of oscillation of the carrier C.

The third embodiment of the invention illustrated in Fig. 4 is designed for dynamically balancing parts of machinery having two journals. In accordance with this object the carrier C of the device is accomplished by a bridge portion $C^{10}$ so as to form a closed two-part frame $C C^{10}$ within which the part E to be tested can be mounted for rotation by means of its journals $e^1$ and $e^2$. Detachably connected to the journal $e^1$ is a sleeve P having a centering point $p^1$ like the former point $d^1$ and adapted to engage the recess $h^1$ of the shaft H. In other respects the device entirely corresponds to the first described embodiments as regards both construction and manner of operation.

The fourth embodiment shown in Figs. 5 to 7 is likewise designed for testing machinery parts having two journals. In this case the frame B is mounted for rotation in the stationary frame A of the device by means of two hollow pivots $b^3$ and $b^{14}$. A sleeve $K^7$ mounted on the hollow pivot $b^3$ so as to be shifted thereon but not to rotate independently and corresponding to the shiftable shaft $K^1$, carries a pin $k^3$ which engages in a helical groove $k^5$ provided on a shaft $k^4$. This shaft $K^4$ corresponds to the former shaft K and is rotatably lodged in the hollow pivot $b^3$, but cannot be shifted thereon. By means of an angle-lever $N N^1$ the sleeve $K^7$ can be shifted in the same manner as the former shaft $K^1$.

The shaft $K^4$ carries a bearing pan $k^6$ upon which rests the knife $q^1$ of a bearing body Q. On its end remote from the knife $q^1$ the body Q is provided with a bearing pan $q^2$ forming the abutment for a knife $p^3$ of a sleeve $P^2$ which corresponds to the sleeve P of Fig. 4, the arrangement being such that the bearing edge of the knife $p^3$ is at right angles to the knife $q^1$. The two knife-bearings $k^6 q^1$ and $q^2 p^3$ thus form a Cardan joint.

The sleeve $P^2$ is detachably connected to one, $e^1$, of the journals of the machinery part E to be tested while its other journal $e^2$ is rotatably held in a sleeve R engaging, by means of a thorn-shaped extension $r^1$ (Figs. 6 and 7), in a bearing pan $b^{15}$. This pan $b^{15}$ is provided on a bridge $b^{16}$ integral with the frame B. The extension $r^1$ is held in engagement with the pan $b^{15}$ by two springs S and $S^1$ one of the ends of which is fixed to the bridge $b^{16}$ while their other ends are attached to projections $r^2$ and $r^3$ of the sleeve R. In the same manner as the carrier C of the former embodiments the sleeve R is subjected to the action of two coiled springs G and $G^1$ the common axis of which is at right angles to that of the extension $r^1$ of the sleeve R (Fig. 7). The springs are in connection with indicating devices not shown in the drawings. Finally the sleeve R has a recess $r^4$ into which may enter a centering point $h^4$ of a shaft $h^3$, the latter corresponding to the former shaft H and being shiftable in the hollow pivot $b^{14}$ by means of the angle lever $L L^1$. The remaining parts of the device correspond to those of the first embodiment.

The device works in the following manner:

The couple of forces acting on the machinery part E upon rotation and the plane of which passes through the axis of rotation of the part E and through a main axis of its ellipsoid of inertia is brought, by rotarily displacing the part E with respect to the frame B by means of the gearing $N^1 N$, $K^7 k^3$, $k^5 K^4 k^6$, $q^1 Q q^2$, $p^3 P^2$, into a position such as to cause its plane to pass through the point of the thorn-shaped extension $r^1$ of the sleeve R and, consequently, be at right angles to the common axis of the springs G and $G^1$. When in this position, the couple of forces will not exert any effect upon the springs G and $G^1$, and this can be stated by the indicating devices (not shown) connected to these springs. Thereupon the part E is turned by 90°, relatively to the frame B, out of the position just ascertained. In this new position the couple of forces exerts its greatest effect upon the springs G and $G^1$ from the tension of which, as indicated by the indicating devices, the amount of said couple of forces and, further, the wanted position of the main axis of inertia can be found by calculation.

In the fifth embodiment of the invention shown in Figs. 8 to 10 the frame B is mounted to rotate about a horizontal axis. The carrier C is mounted for oscillation in the frame B by means of two coaxial centering points $c^{11}$ and $c^{12}$. The machinery part to be tested is rotatably mounted on the carrier C by means of its journals $e^1$ and $e^2$ and takes such a position relatively to the carrier C that its center of gravity 1 lies in the axis of the two centering points $c^{11} c^{12}$.

As in the embodiment of Fig. 4 a sleeve P, having a centering point $p^1$, is detachably connected to one, $e^1$, of the journals of the part E. This centering point $p^1$ forms one half of a releasable friction clutch, the other half is formed by a collar, having a recess $h^1$, of a shaft H, as in the embodiment of Fig. 4. The other journal, $e^2$, of the part E carries a sleeve $R^5$, corresponding to the sleeve R of Fig. 5 and to which one end of two coiled springs G and $G^1$ is attached. The other end of these springs is connected each to a set-screw $F^2$ and $F^3$ respectively. The set-screws $F^2 F^3$ are fixed in the parallel legs of a ⊔-shaped frame $b^{17}$ which is fixed on the frame B and corresponds to the frame $b^9$ of Figs. 1 and 2. The conditions are such as to cause the common axis of the set-screws $F^2$ and $F^3$ to be at right angles to that of the centering points $c^{11}$ and $c^{12}$.

The plane of the couple of forces acting upon the machinery part E is brought, in this case also, at first into a position in which it coincides with the middle plane of the carrier C determined by the common axis of the centering points $c^{11}$ and $c^{12}$ and the axis of rotation of the part E. Thereafter the part E is displaced by 90° relatively to the carrier C and with this new position of the part E, the moment of the couple of forces is measured.

Claims:

1. A device for dynamically determining the position of the center of gravity of a body, comprising a rotating frame, a stationary support for said frame, a swinging bearing supported on said frame and rotating therewith, said body being supported by said swinging bearing and having its central axis in the line with the axis of rotation of said frame, and means for independently rotating said body about its central axis relative to said frame.

2. A device for dynamically determining the position of the center of gravity of a body, comprising a rotating frame, a stationary support for said frame, a swinging bearing supported on said frame and rotating therewith, said body being supported by said swinging bearing and having its central axis in the line with the axis of rotation of said frame, means for independently rotating said body about its central axis relative to said frame, and means for indicating the position of the plane containing one of the main axes of the ellipsoid of inertia of the body and the central axis of the body.

3. A device for dynamically determining the position of the center of gravity of a body, comprising a rotating frame, a stationary support for said frame, a swinging bearing supported on said frame and rotating therewith, said body being supported by said swinging bearing and having its central axis in the line with the axis of rotation of said frame, means for independently rotating said body about its central axis relative to said frame, means for indicating the position of the plane containing one of the main axes of the ellipsoid of inertia of the body and the central axis of the body, and means for maintaining said swinging bearing in its normal position against the disturbing force occurring when said last named axes do not coincide.

4. A device for dynamically determining the position of the center of gravity of a body, comprising a rotating frame, a stationary support for said frame, a bridge pivotally supported at two opposite points in said frame and rotating therewith, said body being supported on said bridge and having its central axis in the line with the axis of rotation of said frame and means for independently rotating said body about its central axis relative to said frame.

5. A device for dynamically determining the position of the center of gravity of a body, comprising a rotating frame, a stationary support for said frame, a bridge pivotally supported at two opposite points in said frame and rotating therewith, said body being supported on said bridge and having its central axis in the line with the axis of rotation of said frame, means for independently rotating said body about its central axis relative to said frame and means for indicating the position of the plane containing one of the main axes of the ellipsoid of inertia of the body and the central axis of the body.

6. A device for dynamically determining the position of the center of gravity of a body, comprising a rotating frame, a stationary support for said frame, a bridge pivotally supported at two opposite points in said frame and rotating therewith, said body being supported on said bridge and having its central axis in the line with the axis of rotation of said frame, means for independently rotating said body about its central axis relative to said frame, means for indicating the position of the plane containing one of the main axes of the ellipsoid of inertia of the body and the central axis of the body, and means for maintaining said bridge in its normal position against the disturbing force occurring when said last named axes do not coincide.

7. A device for dynamically determining the position of the center of gravity of a body, comprising a rotating vertical frame, a stationary support for said frame, a horizontal bridge pivotally supported at two opposite points in said frame and rotating therewith, a vertical mounting member for said body revolubly supported on said bridge, said mounting member having its central axis normally in the line with the axis of rotation of said frame, and means for holding said alignment or allowing a limited swinging movement of said bridge relative to said frame.

8. A device for dynamically determining the position of the center of gravity of a body, comprising a rotating vertical frame, a stationary support for said frame, a horizontal bridge pivotally supported at two opposite points in said frame and rotating therewith, a vertical mounting member for said body revolubly supported on said bridge, said mounting member having its central axis normally in the line with the axis of rotation of said frame, means for holding said alignment or allowing a limited swinging movement of said bridge relative to said frame, said means comprising a vertical shaft in said frame and having its axis coincident therewith, an axially disposed detent in the top of said shaft, an axially disposed downward projection of inverted-cone shape on said mounting member, and means for causing said projection to enter said detent to a predetermined extent.

9. A device for dynamically determining the position of the center of gravity of a body, comprising a rotating vertical frame, a stationary support for said frame, a horizontal bridge pivotally supported at two opposite points in said frame and rotating therewith, a vertical mounting member for said body revolubly supported on said bridge, said mounting member having its central axis normally in the line with the axis of rotation of said frame, a vertical shaft in said frame and having its axis coincident therewith, an axially disposed detent in the top of said shaft, an axially disposed downward projection of inverted-cone shape on said mounting member, said shaft longitudinally displaceable for causing the engagement of said projection in said detent.

10. A device for dynamically determining the position of the center of gravity of a body, comprising a rotating vertical frame, a stationary support for said frame, a horizontal bridge pivotally supported at two opposite points in said frame and rotating therewith, a vertical mounting member for said body revolubly supported on said bridge, said mounting member having its central axis normally in the line with the axis of rotation of said frame, a vertical shaft in said frame and having its axis coincident therewith, a friction clutch between said mounting member and said vertical shaft, means for engaging said clutch, and means for rotating said vertical shaft relative to said frame.

11. A device for dynamically determining the position of the center of gravity of a body, comprising a rotating vertical frame, a stationary support for said frame, a horizontal bridge pivotally supported at two opposite points in said frame and rotating therewith, a vertical mounting member for said body revolubly supported on said bridge, said mounting member having its central axis normally in the line with the axis of rotation of said frame, a vertical shaft rotatably and displaceably mounted in said frame and having its axis coincident therewith, a friction clutch between said mounting member and said vertical shaft, a hollow shaft surrounding said first-named shaft, a high pitch screw connection between said hollow shaft and said frame, said first-named shaft being displaceably but non-rotatably mounted in said hollow shaft and means for displacing said hollow shaft for the purpose of rotating said first-named shaft relative to said frame.

12. A device for dynamically determining the position of the center of gravity of a body, comprising a rotating vertical frame, a stationary support for said frame, a horizontal bridge pivotally supported at two opposite points in said frame and rotating therewith, said body being mounted on said bridge, and opposite acting adjustable members attached to said bridge distant from its horizontal axis for controlling the swinging movement of said bridge relative to said frame.

13. A device for dynamically determining the position of the center of gravity of a body, comprising a rotating vertical frame, a stationary support for said frame, a horizontal bridge pivotally supported at two opposite points in said frame and rotating therewith, said body being mounted on said bridge, opposite-acting elastic tension members attached to said bridge distant from its horizontal axis and to said frame for controlling the swinging movement of said bridge relative to said frame, and means for adjusting said tension members in compensation to the swinging force of said bridge.

14. A device for dynamically determining the position of the center of gravity of a body, comprising a rotating vertical frame, a stationary support for said frame, a horizontal bridge pivotally supported at two opposite points in said frame and rotating therewith, said body being mounted on said bridge, opposite-acting elastic tension members attached to said bridge distant from its horizontal axis and to said frame for controlling the swinging movement of said bridge relative to said frame, means for adjusting said tension members in compensation to the swinging force of said bridge, and a scale cooperating with said adjusting means for measuring said swinging force.

The foregoing specification signed at Essen, Germany, this 12th day of April, 1922.

HERMANN HORT.